United States Patent [19]
Bier

[11] Patent Number: 6,001,266
[45] Date of Patent: Dec. 14, 1999

[54] SEPARATION OF SMALL PARTICLES

[75] Inventor: Martin Bier, Chicago, Ill.

[73] Assignee: ARCH Development Corporation, Chicago, Ill.

[21] Appl. No.: 09/083,571

[22] Filed: May 22, 1998

Related U.S. Application Data

[60] Provisional application No. 60/047,511, May 23, 1997.

[51] Int. Cl.[6] .................................................. B01D 43/00
[52] U.S. Cl. .......................... 210/748; 210/767; 204/571; 204/573
[58] Field of Search .................................. 210/748, 905, 210/767; 204/571, 573

[56] References Cited

FOREIGN PATENT DOCUMENTS 2166659  5/1986  United Kingdom .

OTHER PUBLICATIONS

Bier, Martin & R. D. Astumian, "Biasing Brownian Motion in Different Directions in a 3–State Fluctuating Potential and an Application for the Separation of Small Particles", Physical Review Letters, vol. 76, No. 22, pp. 4277–4280, May 1996.

Astumian, R.D., "Thermodynamics and Kinetics of a Brownian Motor", Science, vol. 276, pp. 917–922, May 9, 1997.

Bier, Martin & R.D. Astumian, "Biasing Brownian Motion in Different Directions in a 3–State Fluctuating Potential and an Application for the Seperation of Small Particles", Physical Review Letters, vol.76, No.22, pp. 4277–4280, May 27, 1996.

Bier, Martin, "Brownian ratchets in physics and biology", Contemporary Physics, vol.38, No.6, pp. 371–379 (1997).

Primary Examiner—David A. Simmons
Assistant Examiner—Frank M. Lawrence
Attorney, Agent, or Firm—Foley & Lardner

[57] ABSTRACT

Small particles, of macromolecular size or the like, are separated in a liquid by size by applying electric fields of predetermined distributions in time and space to enhance the Brownian motion of the particles so as to favor motion of particles of a particular size. When the particles are separated by size they can be removed from the region in which they have accumulated and they can be collected by size.

6 Claims, 4 Drawing Sheets

SEPARATION OF SMALL PARTICLES

CROSS-REFERENCE TO RELATED APPLICATION

This application claims the benefit of U.S. Provisional Patent Application Ser. No. 60/047,511 filed May 23, 1997.

BACKGROUND OF THE INVENTION

The present invention is concerned with separation of small particles. More particularly, the invention is concerned with separation of small particles by use of a fluctuating potential acting on particles having a characteristic coefficient of friction.

Separation of small particles, especially colloidal particles, and in particular macromolecular biological particles in liquids, presents a technical challenge. Mechanical filtration is inadequate or ineffective and, if it is possible, is extremely slow. Mechanical filters are also likely to cause physical damage to proteins and other small particles (of the order of one to one thousand micrometers in major dimensions). The term "major dimension" is taken to mean the diameter of the smallest sphere that would contain the particles.

It is known that nonequilibrium fluctuations in time acting on a particle in an anisotropic periodic potential $U(x)$ can cause transport of the particle in a medium. Thermal noise can complicate the situation and is sometimes necessary to get any flow at all. The study of such systems has been motivated in part by recent advances in the experimental study of motor proteins, i.e., proteins that convert the energy of ATP hydrolysis into motion along a biopolymer. These tiny engines may work by using the nonequilibrium fluctuations, brought about by the ATP turnover, to make a Brownian step in one direction more likely than in the opposite direction. This biasing of Brownian motion is an operating principle that is fundamentally different from that of macroscopic engines. Furthermore, nanotechnological devices have been constructed where the same principles are employed to drive microscopic particles.

In this application we cause a potential to fluctuate in such a way that the direction of the biasing depends on the coefficient of friction of the particle and thus we have a method for the separation of such particles. The setup is summarized by the following Langevin equation:

$$\beta \frac{dx}{dt} = \frac{\delta}{\delta x}[g(t)U(x)] + f(t) + (\beta\sqrt{2D})\xi(t)$$

where $\beta$ is the coefficient of viscous friction, $\xi(t)$ is the function representing zero-average normalized white noise, and D controls the amplitude of this noise. The fluctuation-dissipation theorem $D=kT/\beta$ relates the coefficient of friction and the amplitude of thermal noise. The functions $f(t)$ and $g(t)$ describe the "nonthermal" additive and multiplicative noise, respectively. When $g(t)$ does not vary in time and $f(t)=0$ no transport can occur. Transport occurring with $f(t)=0$ and constant $g(t)$ means that thermal fluctuations are converted into work and implies a violation of the second law of thermodynamics. A great many investigations have focused on additive fluctuations or oscillations. In our method we focus on multiplicative noise, i.e., a $g(t)$ that varies in time while $f(t)=0$, which means that the periodic potential changes shape but no net macroscopic force every occurs. The study of multiplicative noise has already led to the construction of a device to drive and possibly separate small particles or macromolecules. Multiplicative noise is also more likely to be the operating principle for motor proteins. The binding of ATP, the subsequent hydrolysis, and the release of ADP do not cause a macroscopic force along a biopolymer, but simply change the distribution of charges in the motor protein and thus the energy profile that the motor protein "feels" on the periodic biopolymer. The fluctuations of this profile can account for the observed speeds and stopping forces of real motors.

The models for which fluctuation-induced flow has been studied have generally been as simple as possible. A piecewise-linear potential with two pieces per period and a two-state additive or multiplicative Markovian fluctuation allows for analytic evaluation and it can, furthermore, be understood how and why flux occurs and how and why it changes when parameter values are changed. But when only slight complications are added the behavior of the system can become surprisingly rich and flux can actually change its direction more than once when a certain parameter is varied. In the prior art a two-piece piecewise-linear potential has been examined, and this examination showed how in the fast noise limit of an added fluctuation the direction of the induced flow depends on a characteristic of the noise. In a similar system with a three-state fluctuating force the many flux reversals were explained as noise characteristics were varied. Other prior art investigated a three-piece piecewise-linear potential. When transition rates between such a potential and a flat potential are changed, a reversal of flow occurs. While the prior art methods have observed a variety of interesting characteristics of particle flux, there has been no demonstration of the ability to efficiently separate different particles sizes.

It is therefore an object of the invention to provide an improved method and system for separating small particles.

It is another object of the invention to provide a novel method and system for applying a fluctuating potential to separate smaller colloidal particles from larger colloidal particles.

It is a further object of the invention to provide a method and system for applying a motor force to a molecule that is attached to a biopolymer.

These and other objects of the invention will become apparent by reference to the description of the invention.

SUMMARY OF THE INVENTION

Small particles, of the order of 0.1 to 1000 micrometers in major dimensions, are separated in a film of liquid by applying an anisotropic periodic electric field that fluctuates or oscillates in time to bias the Brownian motion of the particles. The different viscosities of the particles in the liquid causes motion of the particles to respond differently to a varying electric field so that the particles tend to accumulate in different regions in the liquid according to their size. In one embodiment of the invention a single container is used to effect the separation. In another embodiment, two or more containers are used to cascade the separation process.

DETAILED DESCRIPTION OF THE INVENTION

Figure 1:
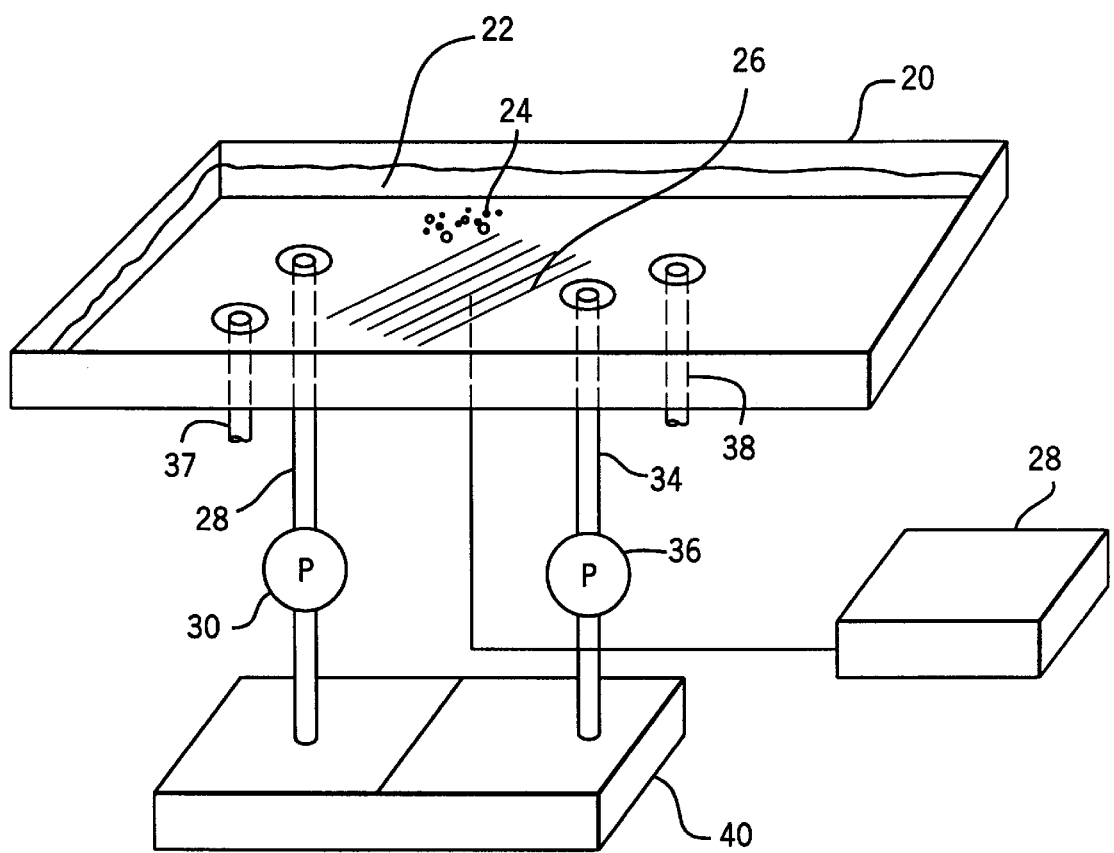
FIG. 1 is a schematic drawing of an apparatus for separating small particles according to the present invention.
Figure 2:
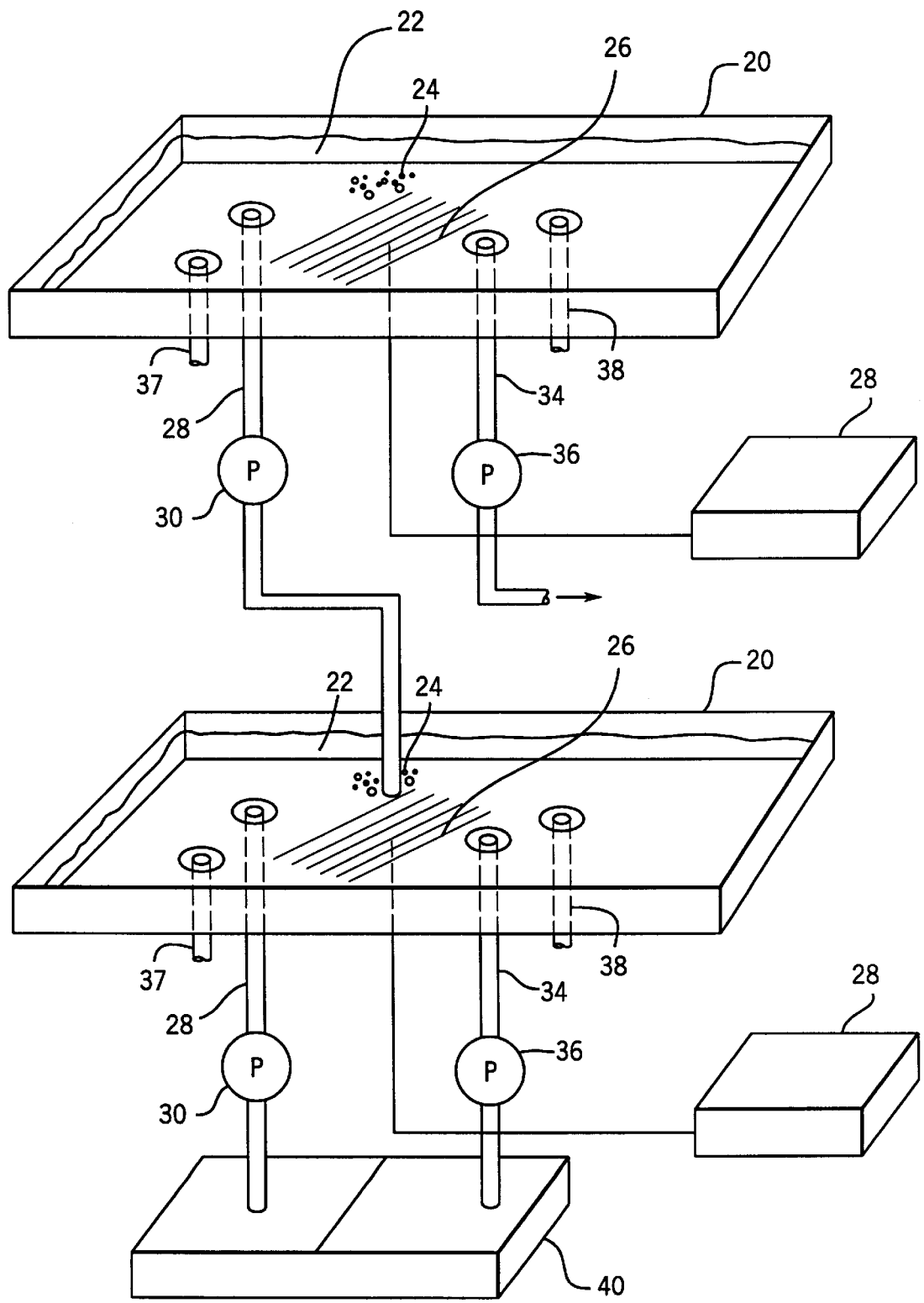
FIG. 2 is a schematic drawing of a cascaded apparatus for separating particles.

FIG. 1 is a schematic drawing of an apparatus for separating small particles according to the present invention, and FIG. 2 is a schematic drawing of a cascaded apparatus for separating particles. In FIGS. 1 and 2, a container 20 contains a liquid 22 and a plurality of particles 24. The particles 24 are typically biological particles, in particular, although not necessarily, proteins, and the liquid 22 is typically water The particles 24 are preferably of a size that subjects them to Brownian motion in the liquid 22; in particular, macromolecules or proteins. A set of electrodes 26 is connected to a power supply 28 to apply an anisotropic periodic electric potential to the liquid 22 and the particles 24 that fluctuates or oscillates in time. We have found that imposing such a potential with the set of electrodes 26 causes differently sized particles 24 to move in opposite direction. This can be characterized as an applied bias to the Brownian motion, with particles 24 affected differently by the applied bias according to their size and the consequent amount of viscous friction in the liquid 22. Appropriate selection of the variable γ, that characterizes the speed of the oscillation/fluctuation in time, causes the smaller ones of the particles 24 to be concentrated in one area of the container 20 and the larger ones to be concentrated in a different area. The electrodes 26 are preferably spaced as close together as possible to take maximum advantage of the Brownian motion. A first tube 28 can be connected to a first pump 30 to extract the fraction of particles 24 that is larger than some arbitrary major dimension $L_1$ and pump the extracted fraction of the particles 24 into a container 40. The second tube 34 can be connected to a second pump 36 to extract the fraction of the particles 24 that is smaller than some major dimension $L_2$ ($L_2 > L_1$). Similar tubes 37 and 38 may be used for further particle extraction. It is thus possible to sort out geometrically identical particles from any suspension to any desired accuracy. The values for $L_1$ and $L_2$ can be set by taking the right value of the parameter γ. The separation process allows for the making of monodispersed colloidal suspensions, i.e., suspensions of particles which are substantially uniform in size. Such monodispersed colloids have many applications in modern technology, such as in the formation of colloidal crystals.

Figure 3:
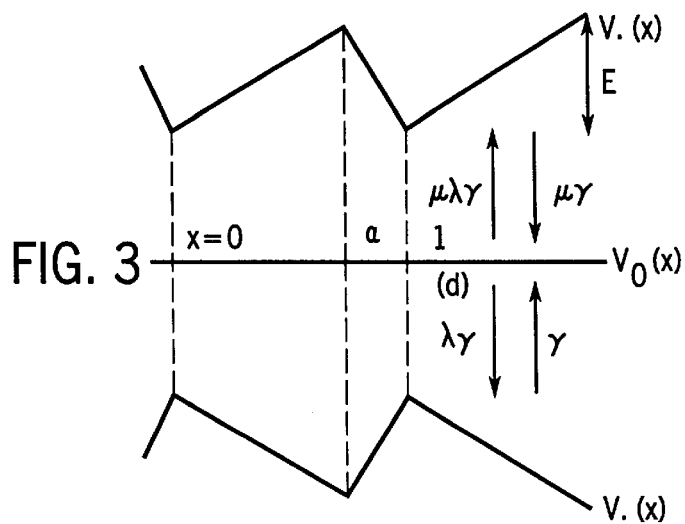
FIG. 3 is a plot of the potential as a function of position along the horizontal X axis with the potential shown along the vertical axis.

A two-piece piecewise-linear potential is considered here, but the imposed fluctuation is multiplicative and three-state. We consider a specific case for which analytic solution is possible and where flux reversals can be intuitively understood. FIG. 3 is a schematic diagram of the potential as a function of position. In FIG. 3 $V_+(x)$ is a two-piece piecewise-linear potential with an energy difference E between minimum and maximum. $V_0(x)$ is a flat potential and by multiplying $V_+(x)$ by −1, which is equivalent to turning it upside down, we obtain $V_-(x)$. The arrows in FIG. 3 indicate how the transitions occur. The transition rates are such that equal amounts of time are spent in $V_{+(x)}$ and $V_{-(x)}$, leaving three parameters, γ, μ and λ, to vary. The value of γ varies all of transition rates and thus the speed of the fluctuations. The parameter μ governs the separation of time scales for the $V_+ \leftrightarrow V_0$ fluctuation relative to the $V_0 \leftrightarrow V_-$ fluctuation; μ times as many transitions are made into $V_+$ as into $V_-$ but the dwelling time in $V_+$ is μ times as small as the one in $V_-$ so the fractions of time in $V_+$ and $V_-$ end up to be the same. Obviously, for μ=1 the system is effectively isotropic and no flux can occur. With λ we can regulate the time spent in $V_0$ relative to $V_+$ and $V_-$. As λ→β the fluctuation becomes dichotomous between $V_+$ and $V_-$ and as λ→0 all time is spent in $V_0$. A commonly used variable is the "flatness". When we identify the $V_+$ state with g=1, the $V_-$ state with g=−1, and the $V_0$ state with g=0, the flatness is defined as $\phi=(g^4)/(g^2)^2$ and as such is a good measure for how close to zero the value of g stays on the average. For our case the flatness can be derived to be $\phi=1+1/(2\lambda)$.

To make the resulting formulas as concise as possible we absorb the coefficient of friction of the Brownian particle β into the time scale, take energy units of kT and take L as the unit of distance. The Fokker-Planck equations for the probability distribution in the stationary state are the following:

$$\begin{bmatrix} F_i^+ - \mu\gamma & \mu\lambda\gamma & 0 \\ \mu\gamma & F_i^0 - (\mu+1)\lambda\gamma & \gamma \\ 0 & \lambda\gamma & F_i^- - \gamma \end{bmatrix}$$

$$\begin{bmatrix} P_i^0 \\ P_i^+ \\ P_i^- \end{bmatrix} = \begin{bmatrix} 0 \\ 0 \\ 0 \end{bmatrix}$$

where i=1 represents the system on the interval (0,α) and i=2 represents the system on the interval (α,1). $P^+(x)$, $P^0(x)$, and $P^-(x)$ are the joint probability densities for the particle to be at x and the potential to be in the $V_+$, $V_0$, or $V_-$ configuration, respectively. The terms $F_i^-$, $F_i^0$, $F_i^-$ are the respective Fokker-Planck operators: $F_i^- = \partial_{xx} P_i^+ - f_i^+ \partial_x p_i^+$ [correct these] and likewise for $F_i^0$ and $F_i^-$, where $f_i^+$, $f_i^0$, and $f_i^-$ represent the forces $-\partial_x V_i^+$, $-\partial_x V_i^0$, and $-\partial_x V_i^-$. Because of the piecewise linearity these forces are independent of x. In the matrix the terms μ, λ, and γ parameterize the flow of probability from one potential to another. $(f_i^+ - \partial_x)P_i^+$ is the flow $J_i^+$ along the x axis in the +state; likewise we have $J_i^0 = (f_i^0 - \partial_x)P_i^0$ and $J_i^0 = (f_i^- - \partial_x)P_i^-$. The net flow at any point x is $J = J_i^+ + J_i^0 + J_i^-$ and in the stationary state this quantity must be the same at any point x. The above matrix equation can be viewed as a way of saying $\partial_x J = 0$ in terms of forces, transition rates, and probability densities. There are boundary conditions at x=α and x=0 (which must coincide with x=1), where the probability densities $P_i^+$, $P_i^0$ and $P_i^-$ and the flows $J_i^+$, $J_i^0$ and $J_i$ must be identical for i=1 and i=2.

The problem reduces to two sets of three coupled ordinary differential equations that are connected at the boundaries x=α and x=0. The two linear systems are sixth order and have constant coefficients. Because of the symmetry of the system the zero eigenvalue turns out to be degenerate, so the solution is the sum of a constant, a linear term, and four exponentials. The coefficients are determined by the connections at x=α and x=0. Because $J = J_i^+ + J_i^0 + J_i^-$ is valid at both x=α and x=0 there is one redundancy, and this leaves room for the normalization of the total probability over one period. A conventional computer algebra system like MATHEMATICA (a trademark of Wolfram Research, Inc.) can solve the system and determine the induced flow within seconds.

Figure 4:
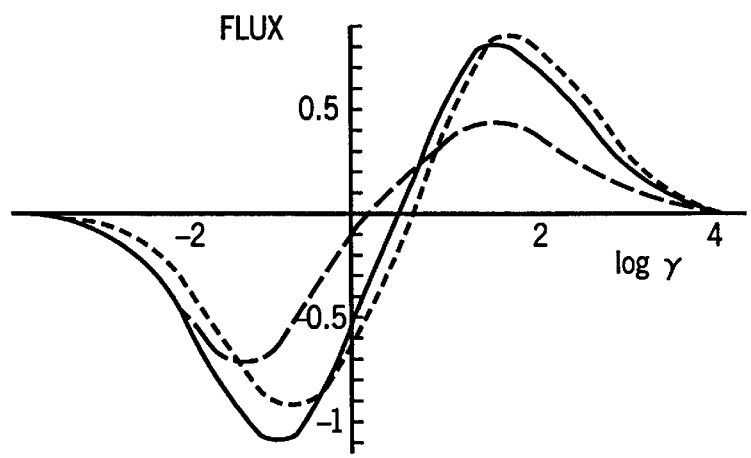
FIG. 4 is a plot of the flux of particles as a function of $\log\gamma$ (a variable which controls the speed of the fluctuation).

FIG. 4 shows the induced flow J as a function of logγ for three different values of λ with μ=1000. There are two extrema and a flux reversal. Maximum and minimum flow have about the same absolute value. Next we will explain flux reversals in terms that are more intuitive and more directly comprehensible than the large body of algebra solved by the MATHEMATICA program.

Figure 5:
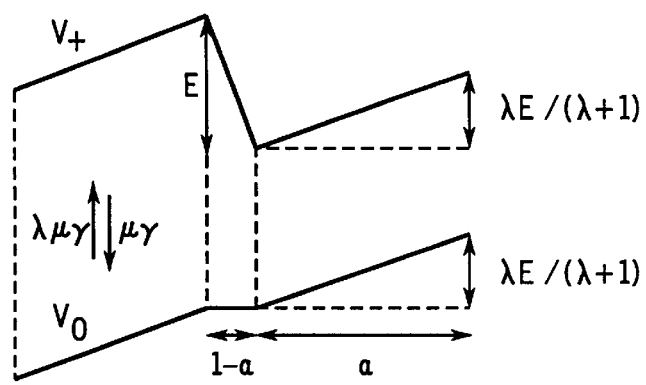
FIG. 5 is a plot of the effective voltage variation at low-frequency for the system of FIG. 3.

We define $-3<\log\gamma<0$ as the low-frequency domain. In this domain the sojourns into the minus state are too rare to be of significance, but the flipping between $V_-$ and $V_0$ is sufficiently frequent to bring about a pumping effect. An important notion is the adiabatic adjustment time. The adiabatic adjustment time on each of the two slopes is the characteristic time for a probability distribution to adjust to the shape of the potential $V(x)$ on that slope and we take this time to be equal to the characteristic time for diffusion over the width of that slope if it were a flat potential. The adiabatic adjustment time on the slope $(0,\alpha)$ thus equals $\alpha^2/2$ and the adiabatic adjustment time on the short slope $(\alpha,1)$ equals $(1-\alpha)^2/2$. In the context of a two-state model there is no significant flux occurring when the dwelling time in each state is much shorter than the time for adiabatic adjustment on each of the slopes. In this case the probability distribution is simply the distribution on the average potential. Maximal flux occurs when the dwelling times are in between the adiabatic adjustment times on the long and the short slope. As shown in FIG. 5, at maximal flux in the low frequency domain we can think of the system as being adiabatic at all times and with a short slope that flips between 0 and $E/\alpha$ and a stationary long slope with the average height of $\lambda E/(\lambda+1)$ (see FIG. 5).

Note that in the $V_+$ state the slopes have opposite signs and that this is not the case in $V_0$. For the purpose of a rough approximation we can assume that no flux occurs in the $V_+$ state and that the negative flux happens because of the sliding down in the $V_0$ state. For the values we took ($E \approx 10$ and $\alpha \approx 10/11$) the time $(1-\alpha)^2/2$ to diffuse over the flat part of the $V_0$ state is negligible in comparison to the time $(\alpha^2/E)$ that it takes to slide down the long slope. Taking $\alpha^2$ to be one and multiplying by the fraction of time spent in the 0 state we derive $J_{low\ fr}=\alpha E/((2\lambda+1)(\lambda+1))$, or in terms of the flatness $J_{low\ fr}=((\phi-1)E/(\phi(2\phi-1))$.

Figure 6:
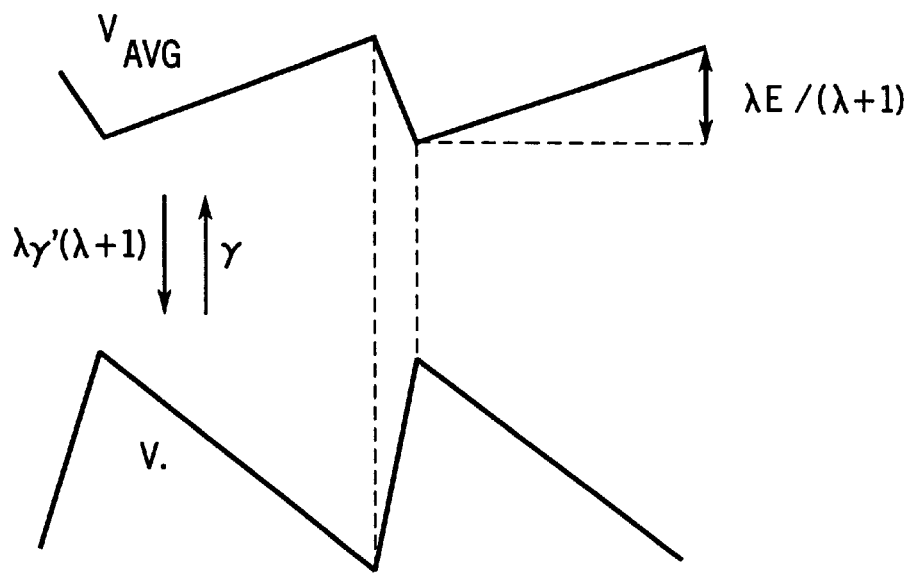
FIG. 6 is a plot of the effective voltage variation at high frequency for the system of FIG. 3.

In the high-frequency domain, $0<\log\gamma<3$, $\mu$ is such that $(\mu\gamma)^{-1}$ is shorter than any adiabatic-adjustment time scale of the system. This means that we think of the system as flipping between the weighted average of the $V_+$ and $V_0$ state, $V_{avg}=(\lambda V_+ + V_0)/(\lambda+1)$, and the $V_-$ state as in FIG. 6.

Figure 7:
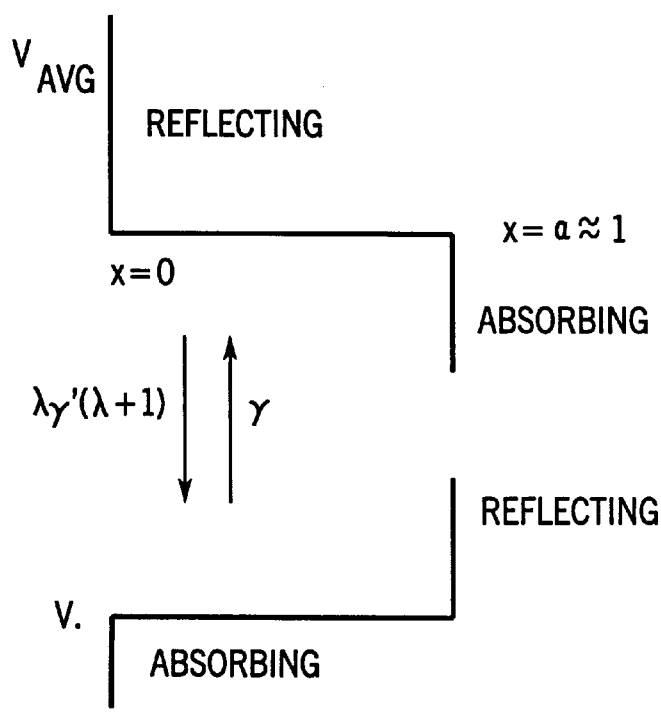
FIG. 7 illustrates how at high γ for high values of E the short slope acts as a fluctuating barrier.

The $1/(\lambda+1)$ appears in front of the rate of the transition to the $-$ state because, when in the $V_{avg}$ state, $1/(\lambda+1)$ is the fraction of time spent in the 0 state from where the transition to the $V_-$ state is possible. As in the previous case, we obtain flux when the dwelling times are between the adiabatic adjustment times of the long slope and the short slope. The long slope has a flat average. For high enough E we can think of the short slope as a barrier that fluctuates between being absorbing and reflecting as in FIG. 7.

For all $\lambda$ the dwelling time in $V_{avg}$ is longer and therefore we expect positive flux. We obtain this flux by subtracting the fraction of time spent in $V_-$ from the fraction spent in $V_{avg}$ and multiplying this difference with the exit rate from the unit interval. For a particle starting at the reflecting barrier it takes on the average half a unit of time to get to the absorbing barrier. This leads to the following estimate for the flux: $J_{high\ fr}=2/(2\lambda+1)$, or in terms of the flatness $J_{high\ fr}=2((\phi+1)/\phi$.

Next we compare the approximations $J_{low\ fr}$ and $J_{high\ fr}$ with the exact evaluations as depicted in FIG. 4. For $\alpha=10/11$ the adiabatic adjustment times of the two slopes are 2 orders of magnitude apart. Their geometric average occurs at $\alpha(1-\alpha)/2$ and on the $\log\gamma$ axis this corresponds to $\log[2/\alpha(1-\alpha)]=1.6$. In the low-frequency domain the geometric average of the transition rates between $V_+$ and $V_0$ is $\mu\gamma(\lambda)^{1/2}$ and in the high frequency domain the geometric average of the transition rates between $V_{avg}$ and $V_-$ is $\gamma/[\gamma/(\gamma+1)]^{1/2}$. In FIG. 4 the minima occur at $\mu\gamma(\lambda)^{1/2}\approx 2/\alpha(\alpha-1)$ and the maxima at $[\lambda/(\lambda+1)]^{1/2}\approx 2/(\alpha(\alpha-1))$ within a factor of 4. The approximations predict that both extrema move left for increasing $\lambda$ and this is indeed the case in FIG. 4. The estimates $J_{low\ fr}$ and $J_{high\ fr}$ are within a factor of 2 from the values of the actual extrema of the flux. The formula for $J_{low\ fr}$ predicts an extremum at $\lambda=(2)^{1/2}/2$. In FIG. 4 we indeed observe that the maximal negative flux is smaller at $\lambda=\frac{1}{3}$ and $\lambda=3$ than at $\lambda=1$. The formula for $J_{high\ fr}$ predicts that the positive maximum becomes larger with decreasing $\lambda$. This prediction is borne out by the curves in FIG. 4.

Upon redimensionalizing the variables possible applications and the current invention come to mind. To unscale the flipping rates they have to be multiplied with $kT/\beta L^2$, where L is the length of a period of the potential and $\beta$ represents the coefficient of viscous friction of the diffusing particle. The value of $\beta$ is specific for each molecule and depends on shape and size. For a given flipping rate, different macromolecules thus find themselves at different locations along the $\log\gamma$ axis in FIG. 3. It is always possible to impose a flipping rate on the system such that a molecule with friction $\beta_2$ moves in a direction opposite to the one of a molecule with friction $\beta_1$. Devices for the separation of macromolecules usually operate based on the fact that molecules with a larger $\beta$ move slower in a certain direction when a force is applied in that direction. The device proposed here is actually able to let molecules with different $\beta$'s move in opposite directions. Thus a device of short length would already be able to separate very efficiently.

In nanotechnology it is now possible to construct grids with a period of about 5 $\mu$m. The creation of a field as in FIG. 3 on such a scale is thus feasible. In dilute solutions proteins like hemoglobin have friction coefficients of about $10-10 s^{-1}$. This translates into a diffusion coefficient of about 50 $\mu m^2/s$. So keeping the system in the flat state for a tenth of a second is enough to allow diffusion over about half a period. In terms of our setup this means that the negative minimum occurs when the flipping rate between $V_+$ and $V_0$ is about 20 Hz and maximum flow occurs when the flipping rate between $V_-$ and $V_0$ is about 20 Hz. After redimensionalization the formulas for $J_{low\ fr}$ and $J_{high\ fr}$ become $$J_{min} = \frac{\lambda}{(2\lambda+1)(\lambda+1)} \frac{EkT}{\beta L} \text{ and}$$

$$J_{max} = \frac{2}{(2\lambda+1)} \frac{kT}{\beta L}$$

When we take E=10 (this is in principle under experimental control with the electrical field strength) we find speeds of about 10 $\mu$m/s.

Polystyrene and latex spheres with submicrometer radii are commercially available. The coefficient of friction of such beads is easily evaluated with the Stokes' formula $\beta=6\pi\eta r$, where $\eta$ is the coefficient of viscosity. A bead with a radius of 0.5 $\mu$m thus has a coefficient of friction that is about 100 times as much as that of a hemoglobin molecule. This means that the extrema of the flux are about 0.1 $\mu$m/s at characteristic flipping rates of about 0.2 Hz and that separation of particles with radii different by a factor of 2 should be accomplishable in under an hour.

Latex and polystyrene beads have a higher dielectric permittivity at optical frequencies than water. This implies that they "like to get out of the dark and into the light."

Periodic light intensity patterns can be easily created with laser beams. When narrow laser lines are oscillated over the film very rapidly (faster than any characteristic timescale of the system) a colloidal particle at position x will feel the average intensity at position x. By taking the right velocity pattern during the oscillation any potential profile can in principle be realized. So the three-state fluctuating potential of FIG. 3 that can separate the particles can also be created using such optical forces instead of electric forces.

The preceding description should be taken as illustrative and not as limiting. The invention is defined by the following claims.

We claim:

1. A method of separating particles disposed in a liquid that are subject to Brownian motion, the method comprising:
    a) applying a selected variable electric field to the liquid to bias the Brownian motion;
    b) removing particles of a first size range from a first region of the liquid; and
    c) removing particles of a second size range that is different from the first size range from a second region of the liquid.

2. The method of claim 1 wherein the particles are in colloidal suspension in the liquid.

3. The method of claim 1 wherein the particles are in the range of 0.1 to 1000 microns in major dimension.

4. The method of claim 1 comprising in addition the steps of:
    a) placing the removed particles of the first size in a second liquid;
    b) applying a selected variable electric field to the second liquid; and
    c) removing particles of a predetermined size range from the second liquid.

5. The method of claim 1 wherein the selected variable electric field switches among three configurations as a function of time.

6. The method of claim 1 wherein the selected variable electric field is an anisotropic periodic function of position.

* * * * *

UNITED STATES PATENT AND TRADEMARK OFFICE
CERTIFICATE OF CORRECTION

PATENT NO. : 6,001,266
DATED : December 14, 1999
INVENTOR(S) : Bier

It is certified that error appears in the above-indentified patent and that said Letters Patent is hereby corrected as shown below:

In col. 1, eqn. 1, change "$\beta \frac{dx}{dt} = \frac{\delta}{\delta x}[g(t)U(x)] + f(t) + (\beta\sqrt{2D})\xi(t)$" to
-- $\beta \frac{dx}{dt} = -\frac{\delta}{\delta x}[g(t)U(x)] + f(t) + (\beta\sqrt{2D})\xi(t)$ --.

In col. 1, line 65, change "every" to -- ever --.

In col. 3, line 18, change "waterThe" to -- water. The --.

In col. 4, line 7, change "$\lambda \rightarrow \beta$" to -- $\lambda \rightarrow \infty$ --.

In col. 4, line 11, change "$\Phi = (g^4)/(g^2)^2$" to -- $\varphi = <g^4>/<g^2>^2$ --.

In col. 4, line 14, change "$\Phi$" to -- $\varphi$ --.

In col. 4, eqn. 2, bottom right formula, change "$F^0_i\text{-}y$" to -- $F^-_i\text{-}y$ --.

In. col. 4, line 34, change "terms $F^-_i$" to -- terms $F^+_i$ --.

In col. 4, line 35, change "operators: $F^-_i$" to -- operators: $F^+_i$ --.

UNITED STATES PATENT AND TRADEMARK OFFICE
CERTIFICATE OF CORRECTION

PATENT NO. : 6,001,266
DATED : December 14, 1999
INVENTOR(S) : Bier

It is certified that error appears in the above-indentified patent and that said Letters Patent is hereby corrected as shown below:

In col. 4, line 35, delete "[correct these]".

In col. 4, line 41, change "+state" to -- + state --.

In col. 4, line 49, change " $J_i^0$ " to -- and $J_i^-$ --.

In col. 5, line 34, change "time ($\alpha$" to -- time $\alpha$ --.

In col. 5, line 61, change "($\Phi$+1)/$\Phi$" to -- ($\varphi$+1)/$\varphi$ --.

In col. 6, line 3, change "$\gamma/|\gamma/(\gamma+1)$" to -- $\gamma/|\lambda/(\lambda+1)$ --.

In col. 6, line 37, change "10-10s$^{-1}$" to -- $10^{-10}s^{-1}$ --.

Signed and Sealed this

Third Day of April, 2001

*Attest:*

NICHOLAS P. GODICI

*Attesting Officer*  Acting Director of the United States Patent and Trademark Office

UNITED STATES PATENT AND TRADEMARK OFFICE
CERTIFICATE OF CORRECTION

| | |
|---|---|
| PATENT NO. | : 6,001,266 |
| APPLICATION NO. | : 09/083571 |
| DATED | : December 14, 1999 |
| INVENTOR(S) | : Martin Bier |

It is certified that error appears in the above-identified patent and that said Letters Patent is hereby corrected as shown below:

In Column 1, line 3, insert --This invention was made with government support under grant number ES006010 awarded by the National Institutes of Health (NIH). The government has certain rights in the invention.--

Signed and Sealed this

Nineteenth Day of February, 2008

JON W. DUDAS
*Director of the United States Patent and Trademark Office*